United States Patent [19]
Dono

[11] Patent Number: 4,608,036
[45] Date of Patent: Aug. 26, 1986

[54] CHAIN V-BELT

[75] Inventor: Junichi Dono, Ishikawa, Japan

[73] Assignee: Daido Kogyo Co., Ltd., Kaga, Japan

[21] Appl. No.: 623,218

[22] Filed: Jun. 21, 1984

[30] Foreign Application Priority Data

Jun. 24, 1983 [JP] Japan .............................. 58-98334[U]

[51] Int. Cl.⁴ .......................... F16G 5/18; F16G 1/24
[52] U.S. Cl. ..................................... 474/201; 474/245
[58] Field of Search ............... 474/245, 242, 201, 244, 474/265

[56] References Cited

U.S. PATENT DOCUMENTS

| 2,225,851 | 12/1940 | Abbott | 474/201 |
| 3,364,767 | 1/1968 | Bredschneider | 474/245 |
| 4,349,343 | 9/1982 | Stephanoff | 474/245 |

FOREIGN PATENT DOCUMENTS

| 551846 | 11/1956 | Belgium | 474/245 |
| 1087849 | 1/1957 | Fed. Rep. of Germany | 474/245 |
| 566774 | 9/1957 | Italy | 474/245 |
| 314293 | 6/1929 | United Kingdom | 474/245 |
| 1112658 | 5/1968 | United Kingdom . | |

Primary Examiner—Stephen J. Novosad
Assistant Examiner—Thuy M. Bui
Attorney, Agent, or Firm—Cushman, Darby & Cushman

[57] ABSTRACT

In a chain V-belt working on a pair of two-split pulley blocks and having a plurality of links coupled endlessly therefor, a projection is formed on the inside of the links when the belt is coupled endlessly, a block slender in section to be long perpendicular of the direction in which the belt runs and short in the direction in which the belt runs is installed on the projection so as to engage with the pulley blocks through both ends of the block, a slip between the belt and the pulley blocks is prevented to transmit a power securely, the belt is made to run stably even at the time of transmission, a large power is transmitted on a small surface pressure.

6 Claims, 11 Drawing Figures

CHAIN V-BELT

BACKGROUND OF THE INVENTION

This invention relates to a chain V-belt for use on stepless speed variators.

A belt used on stepless speed variators is rubber or metallic, and the belt relating to this invention belongs to the latter, which is a V-belt consisting of a metallic chain. In the chain V-belt, various types are used properly according to a purpose, and the most representative belt comprises a type wherein many a link is arrayed, a pin is inserted at every pitches to flexibility, the pin is brought in contact with a pulley on its both ends, and a predetermined power is transmitted on a frictional force arising between both the two.

A conventional form of the above-mentioned belt is as shown in FIG. 1, wherein a pin 1 with both ends slightly projected comes in contact with inside walls 3, 3 of two-split pulley blocks 2, 2, an interval W between the pulley blocks 2, 2 changes in accordance as one pulley block 2 of the two-split pulley blocks 2, 2 moves horizontally in the drawing, points of contact A, B of the pulley blocks 2, 2 and the pin 1 continuously change radially, of the pulley block 2, namely vertically in the drawing, and thus a power is transmitted in a stepless manner from a driving shaft to a driven shaft. However, a belt 5 contacts with the inside wall 3 of the two-split pulley block 2 at the points A, B theoretically, a normal force T vertical to the inside wall 3 is balanced with a radial component of force Fr of tension working on the belt 5 at the points A, B, however, the normal force T must be increased to enhance a frictional force between both ends of the pin 1 and the inside wall 3 for transmitting a large power, and thus there may arise a case where an exceedingly high pressure works on the points A, B beyond a permissible pressure to withstand. Accordingly, a contact area between the inside wall 3 of the two-split pulley block 2 and the pin 1 will have to be enlarged in such a case.

On the other hand, portions whereat the inside wall 3 of the two-split pulley block 2 and the pin 1 come in contact with each other are the points of contact A, B on both ends of the pin 1, and further the inside wall 3 has a predetermined inclination, therefore a push force P from each of the pulley blocks 2, 2 works radially outside of a center line C—C of the pin 1, namely radially outside of a tension line working on the belt 5, thus the belt 5 is spoiled for nip force to the pulley block 2 and hence for normal tightness with the pulley block 2, and the belt 5 is capable of slanting during use.

Then, in U.S. patent specification U.S. Pat. No. 4,349,343, there is disclosed an apparatus wherein a cylindrical block (referred to as "drive pin" in the specification) is provided in the form of offsetting inward or outward to the pin other than a pin coupling the links, an end of the block and an inside wall of the pulley are brought in contact with each other to transmit a driving force. In the apparatus, however, while a push force can be made to work effectively on the block by positioning the block radially inside of the pin, the block is circular in section as in the case where the pin shown in FIG. 1 is used to serve as the block at the same time, a contact length with the pulley block inside wall 3 is equal to the diameter D even at maximum accordingly, but actually the end is conical in shape, therefore the contact length is ½ of the diameter. On the other hand, the pulley block inside wall 3 is curved to a link straight line based on the chain V-belt as shown in FIG. 8, therefore a block 13 to transmit a power in contact with the pulley block 2 comes in contact with the pulley block inside wall 3 at points P1, P1, therefore to transmit the power more efficiently, it is preferable that the block 13 come in contact with the inside wall 3 at a maximum contact line L1 passing the center as shown in FIG. 2, however, it shifts somewhat horizontally in the drawing actually according to a state at the time of contact. In the case of a block 13' circular in section as shown in FIG. 2, the length of a contact line L2 suddenly decreases in accordance as the contact line moves horizontally in the drawing to the maximum contact line L1, and further in the case of a block 13" conical in the end surface as shown in FIGS. 3 (a), (b), it decreases suddenly furthermore, a surface pressure between the block and the inside wall 3 rises, the block is thus worn out one-sidedly or oscillates heavily to give rise to noise, and further a life of the V-belt deteriorates in consequence. It is then necessary to enlarge the diameter D of the blocks 13', 13" for making the contact line longer, however, since the blocks come inside of the pin, there may arise an interference between adjacent blocks or the block and the link. Further, in the case of the above-mentioned U.S. patent specification, the blocks 13', 13" are fitted in slidably to the links and circular in section in addition, therefore the blocks slide and turn at every junctions to the pully block 2, a block fitting hole is thus worn out so early, a life of the belt deteriorates, and oscillations to arise are capable of spoiling a correct transmission operation consequently.

SUMMARY OF THE INVENTION

A main object of the invention is to provide a chain V-belt wherein a contact area of a block for transmitting a power between pulley blocks and a belt is large to work, and thus a large driving force can be transmitted on a small surface pressure, and is further to provide such a chain V-belt as is minimized for slippage to arise between the V-belt and the pulley blocks and thus capable of attaining a high power transmissibility.

The invention therefore comprises forming a projection inside the direction in which links are deformed when the chain V-belt is coupled endlessly, installing a block slender in section which is long perpendicular to the direction in which the belt runs but short to the direction in which the belt runs on the projection so as to engage with the pulley blocks through both ends of the block.

DESCRIPTION OF THE PREFERRED EMBODIMENT

A preferred embodiment of this invention will now be described with reference to the accompanying drawings.

Figure 1:
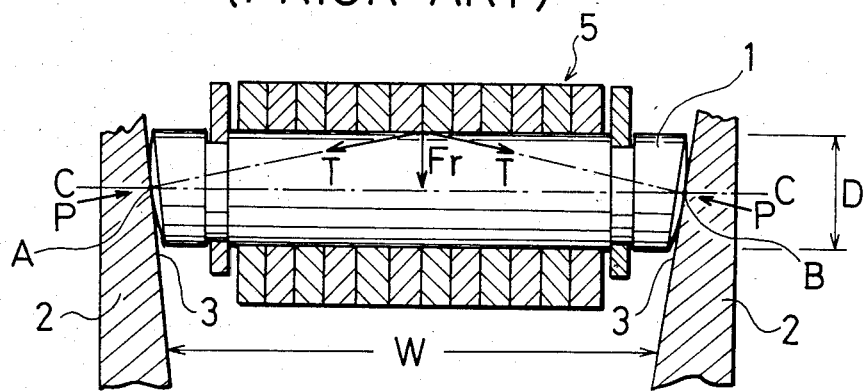
FIG. 1 is a drawing representing a chain V-belt used hitherto.
Figure 2:
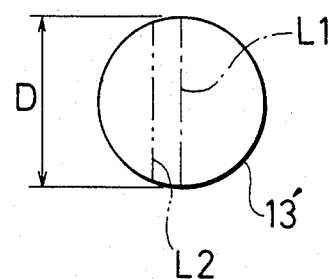
FIG. 2 is a front view representing one example of a block in the conventional chain V-belt.
Figures 3A, 3B:
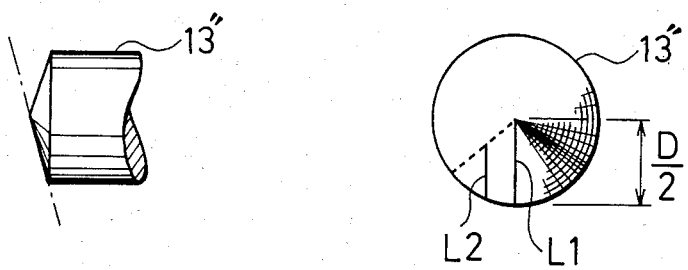
FIG. 3 (a) and FIG. 3 (b) are a side view and a front view, respectively, representing another conventional block.
Figure 4:
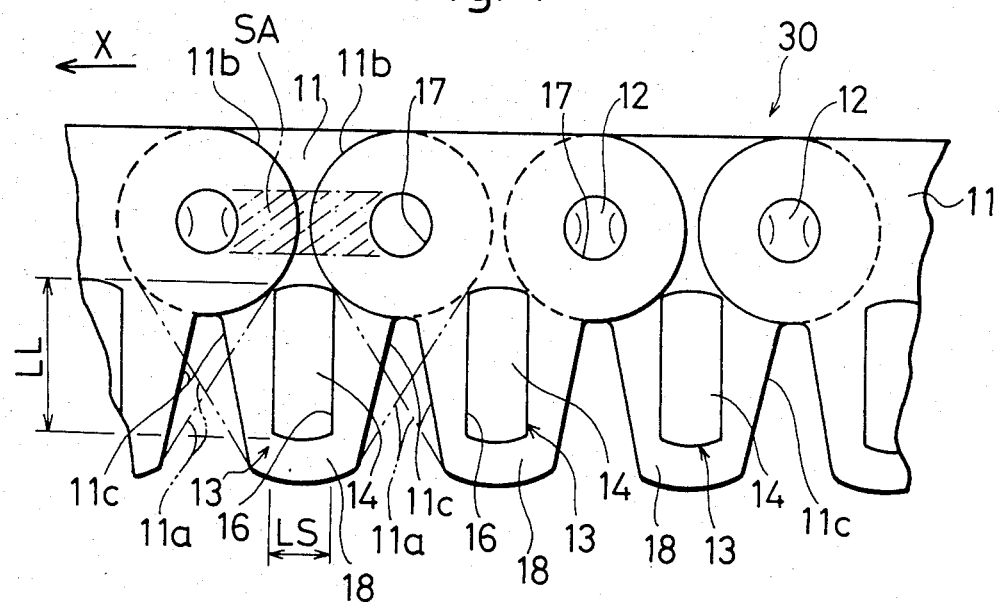
FIG. 4 is a front view representing a chain V-belt given in one embodiment of this invention.
Figure 5:
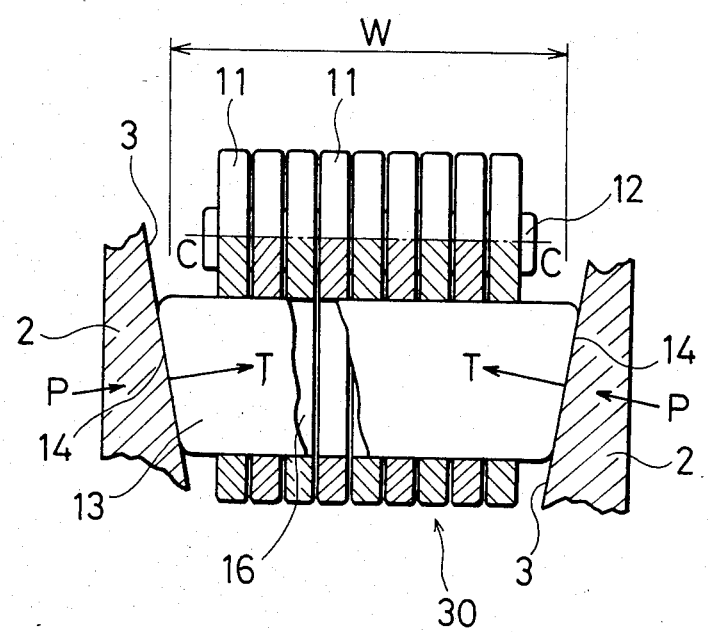
FIG. 5 is a side sectional view of the chain V-belt of FIG. 4.

As shown in FIG. 4 and FIG. 5, one embodiment of the chain V-belt relating to this invention comprises each part of a plate-like link 11, a pin 12 and a block 13, and when wound on the two-split pulley block 2, it comes in contact with the pulley block inside wall 3 at an end 14 of the block 13, thus transmitting a predetermined power. That is to say, a chain V-belt 30 of FIG. 4 and FIG. 5 comprises coupling the links 11 placed one over another through the pin 12, which forms a multipanel body flexible mutually round the pin 12 at every pitches, and when the V-belt is made endless to work, the link 11 projects in the direction positioned radially inside to form a projection 18, and further a hole 16 almost rectangular is provided on a center line between the pins 12, 12 at the projection 18.

Accordingly, two pin holes 17, 17 and the hole 16 to install the block 13 therein are provided at constant intervals on the links 11 before being assembled as the chain V-belt 30, and these are given in a positional relation to come at vertexes of an almost inverted triangle.

In this embodiment, the block 13 passes through all the holes 16 of the links 11 in the same pitch, as shown in FIG. 5, however, it can be arranged so otherwise that the block 13 will pass only the links on both sides at each pitch and the links 11 in the neighborhood of the center, and other links 11 will be circular arc in shape on both ends without projection.

The block 13 is a rigid body, both the ends 14 then come in contact with the inside wall 3 of the two-split pulley block 2, an angle of inclination of both the ends 14 coincides with that of the inside wall 3, and the length is reasonably given so as not to allow the link 11 and the pin 12 to come in contact with the inside wall 3. Further, a cross section of the block 13 is same in shape as the hole 16, and the block 13 is fixed to the link 11 so as not to move crosswise in FIG. 5 and not to turn for stable contact with the two-split pulley block inside wall 3.

Moreover, the block 13 is slender in section to be long LL perpendicular of the direction indicated by an arrow X in which the chain runs and short LS in the chain running direction X as shown in FIG. 4.

Then, the hole 16 for inserting the block 13 therein which is formed on the link 11 is perforated at a spot coming considerably off a stress transfer band SA connecting the holes 17, 17 through which the pin 12 coupling each link 11 is installed, further a zone 11c thinned in the direction of the hole 16 instead of an outer perimeter 11a of the link 11 being formed to come in contact with the circular arc of a pin mounting area 11b, as indicated by a two-dotchain line in FIG. 4, is provided on both sides of the projection 18 in which the hole 16 is perforated and thus each link 11 is formed almost into T shape.

On the other hand, the V-belt 30 on which the block 13 is installed is not necessarily limited to a leaf chain type (like that of FIG. 4 and FIG. 5) with the links 11 placed one upon another but can be constituted as a bush chain type with only outside and inside links formed as FIG. 4, and the bush chain can also be arranged to a multiple row according to the magnitude of a load. In this case, the block 13 is locked on the link in the form of passing through each of the outside and inside links of the bush chain.

As described above, the chain V-belt 30 relating to this invention has the projection 18 of having the link 11 projected almost to a T-shape in the direction of the inside diameter when the belt 30 is wound on the two-split pulley block 2, the block 13 is inserted and locked in the hole 16 almost rectangular which is provided on the projection 18, and the block 13 is brought in contact and friction with the two-split pulley block inside wall 3 at both the ends 14, 14 to transmit a predetermined power.

Figure 10:
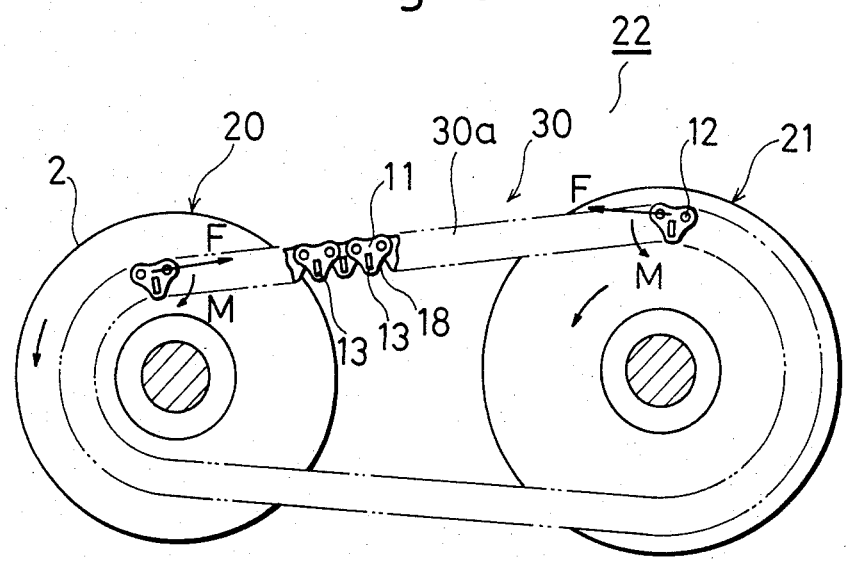
FIG. 10 is a schematic front view representing one example of a stepless speed variator for which the chain V-belt relating to this invention is used.

Then, in a power transmission by a stepless speed variator 22 comprising a driving side pulley 20, a driven side pulley 21 and the chain V-belt 30, a belt tension F works on the pin 12 for the belt 30, and a torque is transferred to (or from) the pulley block 2 for the block 13 to come in contact with each pulley block 2, as illustrated in FIG. 10, thus giving rise to a frictional force. Then the block 13 comes radially inside of the pin 12, which may cause a clockwise moment M to work on the link 11 constituting the belt 30 at the driving side pulley 20 and a counterclockwise moment M to work thereon at the driven side pulley 21. Accordingly, the moment M works to nip a V-belt 30a portion on tension side into the pulleys 20, 21, the V-belt 30 or each block 13 above all is nipped between the pulley blocks 2 against a centrifugal force according to a revolution of the belt 30 or a relief force of the belt 30 according to an inclined plane of the pulley inside wall 3, thus preventing a slip from arising to the utmost. Further, the moment M working in the direction where the block 13 is nipped into the pulley block 2 changes according to the belt tension F or a transmission force, a nip moment according to a load is obtained consequently, an early wear due to an excess contact of the block and the pulley block can be prevented in the case of low load, and a slip can be prevented on a large contact force in the case of high load.

Further, a push force P from the pulley block 2 works on the belt 30 in the normal direction T, as shown in FIG. 5, however, the push force P from the pulley block 2 works radially inside of the center line C—C of the pin 12, namely at a spot coming considerably off a tension working line of the belt to the radial inside, and thus an inclination of the belt 30 is effectively prevented.

Figure 8:
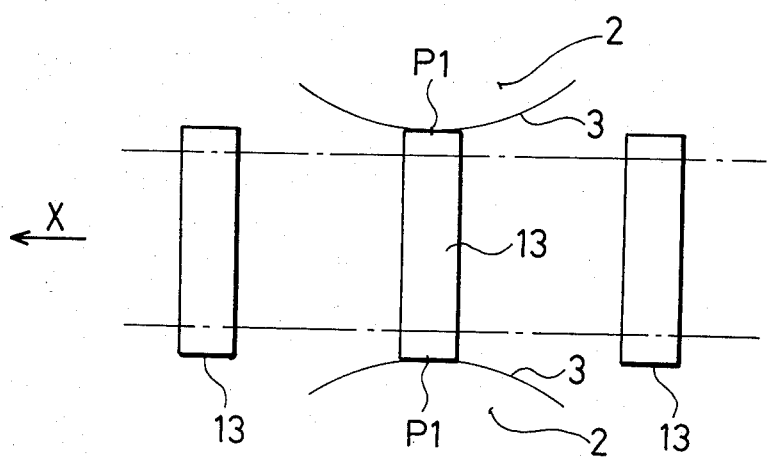
FIG. 8 is a plan view representing a state in which a chain V-belt and pulley blocks are brought in contact with each other.

Then, the block 13 comes in contact with the inside wall 3 only at points P1, P1, as shown in FIG. 8, due to a linear shape of the block 13 and a conical shape of the pulley block inside wall 3, therefore transmissibility may depend on a length of the maximum contact line L1 at the point P1, however, as already described hereinabove, the block 13 of the V-belt 30 according to this invention is formed in a slender shape long LL perpendicular of the running direction X, therefore the maximum contact line L1 is extremely prolonged, and thus a large frictional force or power transmission force is obtainable on a small surface pressure.

Figure 9:
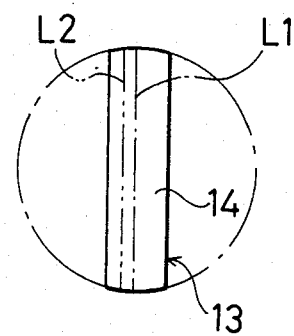
FIG. 9 is a front view representing a block used for the belt of FIG. 4.

Further, the block 13 is slender in section, therefore if it is brought in contact with an inside wall 3 not on the maximum contact line L1 but at a spot coming off somewhat horizontally in FIG. 9, the contact line L2 in such a case will not suddenly decrease to the maximum contact line L1, and thus a surface pressure working between the block 13 and the inside wall 3 doesn't suddenly increase to prevent the block 13 from being worn out one-sidedly.

As described above, according to this invention, the projection 18 is formed on the link 11 constituting the chain V-belt 30 radially inside when the belt 30 is coupled endlessly, the block 13 slender in section which is long LL perpendicular of the belt running direction X and short LS in the belt running direction X is installed on the projection 18 so as to engage with the pulley block 2 through both ends 14, 14 of the block 13, therefore the belt 30 is prevented from slipping on the inward moment M and thus retained stably, and not only a high power transmissibility can be attained thereby but also a tightness between the pulley block 2 and the belt 30 is kept in good condition even in the case of chainging speed, thus preventing an occurrence of the state wherein the chain is inclined during use. Further, the contact lines L1, L2 extremely long and less fluctuating as compared with a conventional block circular in section will be obtainable with the pulley block 2, a large driving force can be transmitted on a small surface pressure, thereby contributing to an enhancement of a power transmitting ability of the chain V-belt 30. Furthermore, since the block 13 can be prevented from a one-sided wear, an occurrence of oscillation and noise caused thereby can be prevented, and a life of the belt 30 can be maintained for a long period of time.

Figure 6:
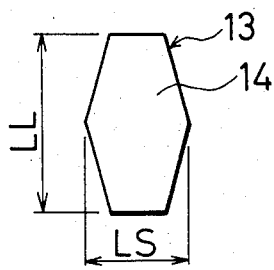
FIG. 6 and FIG. 7 are front views representing another example of the block.
Figure 7:
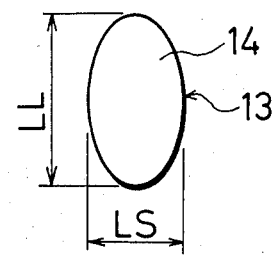

Then, a sectional form of the block 13 is not necessarily limited to the rectangle shown in FIG. 4 and FIG. 9, but any slender form to be long LL perpendicular of the direction indicated by an arrow X in which the belt runs and short LS in the belt running direction X will be acceptable, and it goes without saying that various forms such as, for example, polygon shown in FIG. 6, ellipse shown in FIG. 7 and the like will be conceivable.

Thus, a formation of the block 13 into a slender shape in section to be long LL perpendicular of the direction indicated by the arrow X in which the belt runs and short LS in the belt running direction X may be effective in taking a section modulus in the direction LL of the block 13 so large as compared with a circular section having the even area, therefore such structure as is exceedingly strong against a bending moment working longitudinally will be realizable. This may be taken very effective in consideration of the force working from the pulley block 2 to the block 13 in the direction LL several times as heavily as the direction LS of the block 13 which is a running direction of the belt 30.

Further, the block 13 is required to function only for delivery of a torque with the inside wall 3 and not as a pin of the chain for transmitting power to a driven shaft side, therefore a material will be limited and so selected as optimum for use on the block 13.

Furthermore, since the block 13 is fixed to the hole 16, wear and metal fatigue arising in the periphery of the hole 16 for possible oscillations of the block 13 in the hole 16 during running of the belt 30 can be decreased, thereby prolonging the life of the belt 30.

Then, in case the thinned zone 11c is formed on both sides of the projection 18 of the link 11, an interference between the adjacent blocks 13 and the link 11 will be decreased as compared with the case where the thinned zone 11c is not provided, as indicated by the two-dot chain line in FIG. 4, therefore a minimum winding diameter of the belt 30 can be made small thereby, and thus the overall speed variator including the pulleys can be miniaturized.

Further, the hole 16 is provided downward (FIG. 4) of the stress transfer band SA connecting the holes 17, 17 through which the pin 12 is installed, namely on a side of the projection 18, therefore the stress transfer band SA which is a main area in which a tension working on the belt 30 is propagated as stress can be avoided for the hole 16, a concentration of the stress arising from the tension on the hole 16 will be lessened accordingly, and thus a local yield and an occurrence of deformation of the link member can effectively be prevented.

The invention has been described as above with reference to the operative examples, however, the embodiments mentioned in the specification are illustrative and hence is not restrictive. It is to be understood that a scope of this invention is as defined in the appended claims and not limited to the specific embodiments thereof. Accordingly, all changes and modifications that fall within bounds of the claims are intended to be embraced by the invention.

What is claimed is:

1. In a chain V-belt working on a pair of two-split pulley blocks and having a plurality of links coupled endlessly therefor and having a block installed on each of said links, for transmitting power by the frictional force arising between said link blocks and said pulley blocks in such a manner that both ends of each of said link blocks are brought in contact with said pulley blocks, the improvement characterized in that a projection is formed on the inside of each of said links when said belt is coupled endlessly, the link blocks are installed on said projections and each of said link blocks has a substantially rectangular section which is longer in the direction perpendicular to that in which the belt runs than in the direction in which the belt runs.

2. The chain V-belt as defined in claim 1, wherein the block is fixed to the links.

3. The chain V-belt as defined in claim 1, wherein a thinned zone is formed on both sides of the link projection.

4. The chain V-belt as defined in claim 1, wherein a hole through which the block is installed is disposed to come off a stress transfer band connecting holes through which pins are installed toward the projection side.

5. The chain V-belt as defined in claim 1, comprising a relief chain type with links placed one upon another to coupling.

6. The chain V-belt as defined in claim 1, comprising a bush chain type with inside and outside links coupled therefor.

* * * * *